United States Patent
Zoon et al.

(10) Patent No.: US 11,226,239 B2
(45) Date of Patent: Jan. 18, 2022

(54) DC CHARGING CABLE AND METHOD FOR DETERMINING A TEMPERATURE OF THE DC CHARGING CABLE

(71) Applicant: ABB Schweiz AG, Baden (CH)

(72) Inventors: Wiebe Zoon, Delft (NL); Rolf Bilderbeek, Utrecht (NL); Stefan Raaijmakers, Delft (NL); Gertjan Koolen, Eindhoven (NL)

(73) Assignee: ABB Schweiz AG, Baden (CH)

(*) Notice: Subject to any disclaimer, the term of this patent is extended or adjusted under 35 U.S.C. 154(b) by 288 days.

(21) Appl. No.: 16/420,234

(22) Filed: May 23, 2019

(65) Prior Publication Data
US 2019/0360873 A1   Nov. 28, 2019

(30) Foreign Application Priority Data

May 23, 2018   (EP) .................................... 18173799

(51) Int. Cl.
| | | |
|---|---|---|
| *G01K 7/16* | (2006.01) | |
| *B60L 53/10* | (2019.01) | |
| *B60L 53/18* | (2019.01) | |
| *H01R 13/66* | (2006.01) | |
| *H02J 7/00* | (2006.01) | |

(52) U.S. Cl.
CPC ................ *G01K 7/16* (2013.01); *B60L 53/11* (2019.02); *B60L 53/18* (2019.02); *H01R 13/6683* (2013.01); *H02J 7/007* (2013.01); *H02J 7/0045* (2013.01); *B60L 2270/00* (2013.01); *G01K 2217/00* (2013.01)

(58) Field of Classification Search
USPC ........................................................ 320/107
See application file for complete search history.

(56) References Cited

U.S. PATENT DOCUMENTS

2012/0262115 A1* 10/2012 Ichikawa ............ B60L 11/1816
                                                        320/109
2015/0002104 A1    1/2015 Moell
(Continued)

FOREIGN PATENT DOCUMENTS

DE     202014000328 U1    6/2015
EP        0823766 A1      2/1998
(Continued)

OTHER PUBLICATIONS

European Patent Office, Extended Search Report issued in corresponding Application No. 18173799.0, dated Sep. 14, 2018, 7 pp.

*Primary Examiner* — Mohammed Alam
(74) *Attorney, Agent, or Firm* — Greenberg Traurig, LLP

(57) ABSTRACT

The application relates to direct current, DC, charging cable including two DC conductors configured for transmitting electrical energy between an electrical vehicle and a charging device, at least a signal line having a first signal line end and a second, opposite signal line end and a control device, the first signal line end is connected at a first connection point to one of the DC conductors, and the control device is configured for measuring a voltage difference between the second signal line end and a second connection point of the one of the DC conductors distant to the first connection point for determining a temperature of the DC charging cable.

20 Claims, 1 Drawing Sheet

(56) References Cited

U.S. PATENT DOCUMENTS

2015/0147919 A1* 5/2015 Seelig .................... B60L 53/16
439/695
2019/0360873 A1* 11/2019 Zoon ....................... B60L 53/18

FOREIGN PATENT DOCUMENTS

| JP | 2011015581 A | 1/2011 |
| WO | 2005081276 A1 | 9/2005 |

* cited by examiner

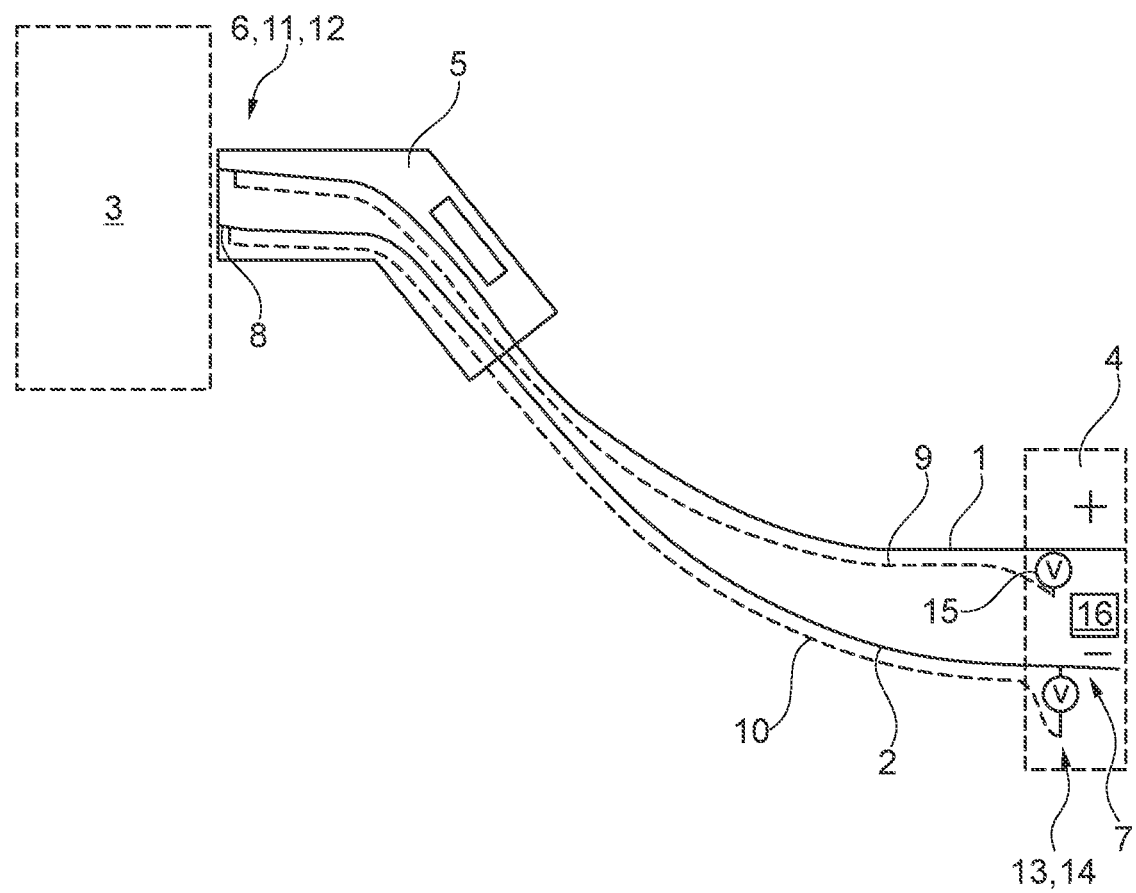

DC CHARGING CABLE AND METHOD FOR DETERMINING A TEMPERATURE OF THE DC CHARGING CABLE

TECHNICAL FIELD

The invention relates to a direct current, DC, charging cable comprising two DC conductors configured for transmitting electrical energy between an electrical vehicle and a charging device. The invention further relates to a method for determining a temperature of the DC charging cable, comprising two DC conductors configured for transmitting electrical energy between an electrical vehicle and a charging device.

BACKGROUND ART

Electrical vehicles have become very popular in many countries. For charging said vehicles with electrical energy, charging devices are being installed in public space such as parking lots or at private premises. Said charging devices are equipped with charging cables, which are plugged by means of a charging connector into the electrical vehicle. During a charging session with nowadays charging devices, currents of 500 A or more are applied onto the charging cable for enabling so called fast charging. Cable resistances of copper within the charging cable lead to a temperature increase of the charging cable. The charging cable easily reaches temperature of 70° Celsius or more if currents of 500 A or more are applied, even if the charging cable is cooled by a coolant.

Thus, monitoring the temperature of the charging cable is an important aspect in order to avoid overheating and malfunction of the charging cable. However, today's conventional means do not allow for accurately determining the temperature of such charging cables. Known solutions, for example, do not monitor the whole charging cable, stop monitoring the temperature if flow of a coolant stops or the measurement solution for determining the temperature is not applicable for electrical vehicles.

SUMMARY OF INVENTION

It is therefore an object of the invention to provide a DC charging cable and a respective method for easily and accurately determine the temperature of the charging cable.

The object is solved by the features of the independent claims. Preferred embodiments are detailed in the dependent claims.

Thus, the object is solved by direct current, DC, charging cable comprising preferably at least two DC conductors configured for transmitting electrical energy between an electrical vehicle and a charging device, at least a signal line having a first signal line end and a second, opposite signal line end and a control device, whereby the first signal line end is connected at a first connection point to one of the DC conductors, and
the control device is configured for measuring a voltage difference between the second signal line end and a second connection point of the one of the DC conductors distant to the first connection point for determining a temperature of the DC charging cable.

The object is further solved by a method for determining a temperature of the DC charging cable, comprising preferably at least two DC conductors configured for transmitting electrical energy between an electrical vehicle and a charging device, at least a signal line having a first signal line end and a second, opposite signal line end, whereby the first signal line end is connected at a first connection point to one of the DC conductors, and comprising the step of:

measuring a voltage difference between the second signal line end and the one of the DC conductors at a second connection point distant to the first connection point for determining the temperature of the DC charging cable.

It is therefore a key point of the invention to measure the voltage difference and based thereon to determine the temperature of the DC charging cable respectively of the DC conductors. During a normal charging session, currents, typically in the range of 500 A for so called fast charging, flow from the charging device towards the electrical vehicle. As the signal line it only connected at the first signal line end to one of the DC conductors, while being connected at the second signal line end for example by a voltage measurement device to the DC conductor, no current flows through the signal line such that there is no voltage difference between the first signal line end and the second signal line end.

Due to the current flowing through the DC conductors and due to an internal resistance of the DC conductors, the voltage difference, also referred to as voltage drop, measured between the second signal line end and the second connection point allows for determining the actual temperature of the DC conductor respectively of copper of the DC conductor and therefore of the DC charging cable, as the voltage drop over a copper cable depends at a certain current on its temperature. Thus, the proposed DC charging cable respectively the method uses thermo-electric properties of the DC conductors itself for easily and precisely determining the actual temperature of the DC conductor. Specifically, the proposed DC charging cable respectively the method allows, in particular based on a known respectively calibrated resistance of the DC conductors, based on an actual charging current and based on a so determined actual resistance of the DC conductors from the measured current and voltage difference, a precise determination of the temperature of the DC conductors respectively of the DC charging cable.

The DC charging cable may comprise further conductors, such as, for example, a Proximity Pilot, PP, line for a PP signal, a Control Pilot, CP, line for a CP signal line and/or a PE line for a PE signal. PP line, CP line and/or PE line and respectively signalling are preferably implemented according to the so called Combined Charging System, CCS, protocol, in particular according to IEC 61851 or IEC 61851-23 standard. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides that other protocols such as, for example, CHAdeMO, as abbreviation of CHArge de Move, or GB/T, in particular according to 20234.3-2011 standard, can also be used with the described DC charging cable respectively the method. The DC charging cable and the method is applicable to different type of electrical vehicles, including for examples electrical busses. Preferably, the DC charging cable and/or the method is configured for charging the electrical vehicle with a DC input voltage up to 1500 V DC.

Generally, the voltage difference, also simply referred to as voltage, can be determined by different means. According to a preferred implementation, the DC charging cable or method comprise a voltage measurement device arranged between the second signal line end and the second connection point and configured for determining and/or measuring the voltage difference. The voltage measurement device can be integrated within the DC charging cable, with the control device and/or within the charging device.

In another preferred implementation of the DC charging cable or of the method, the signal line runs between the first connection point and the second connection point parallel and/or adjacent to the one of the DC conductors. Preferably, the signal line runs at least a distance parallel to the DC conductors. More preferably, the signal line runs between a complete extension of the DC conductors parallel to the DC conductors and/or comprise the same or a similar length of the DC conductors. The first connection point of electrical connection between the signal line and the DC conductor and the second connection point are preferably at least 2, 3, 4 or 5 m distant to each other. The longer the distance the more accurately the temperature can be determined.

In a further preferred implementation, the DC charging cable or the method comprises a second signal line having a respective first signal line end and a respective second, opposite signal line end, whereby
the respective first signal line end is connected to the other one of the DC conductors at a respective first connection point, and whereby,
in regard to the DC charging cable,
the control device is configured for measuring a second voltage difference between the respective second signal line end and a respective second connection point of the other one of the DC conductors distant to the respective first connection point for determining a second temperature of the DC charging cable, or whereby
in regard to the method, the method comprising the step of:
measuring a second voltage difference between the respective second signal line end and a respective second connection point of the other one of the DC conductors distant to the respective first connection point for determining a second temperature of the DC charging cable. Such way the temperature can be more accurately determined, as the voltage difference respectively the temperature of both DC conductors is determined.

In a further preferred implementation of the DC charging cable or of the method, in regard to the DC charging cable, the control device is configured for combining the measured voltage difference and the measured second voltage difference and/or the determined temperature and the determined second temperature or, in regard to the method, the method comprising the step of: Combining the measured voltage difference and the measured second voltage difference and/or the determined temperature and the determined second temperature. The combination can be done, for example, by calculating an average temperature and/or voltage difference of the measured temperature and second temperature respectively voltage difference and second voltage difference. Alternatively, the control device can be configured for respectively the method uses both the measured voltage difference and the measured second voltage difference and/or both the determined temperature and the determined second temperature individually, for example to determine if charging needs to be stopped or the charging current needs to be reduced.

In another preferred implementation of the DC charging cable or of the method, the DC charging cable and/or the DC conductors comprises a first end and a second, opposite end, the first connection point is at the first end and the second connection point is at the second end. Thus, the first and second connection points are preferably arranged at both the opposite, utmost ends of the DC charging cable and/or the DC conductors, thereby allowing an accurate determination of the voltage difference respectively of the temperature.

In a further preferred implementation, the DC charging cable or the method comprises a charging connector to which a first end or a second, opposite end of the DC charging cable is connected, whereby the first connection point is arranged within the charging connector. Such way connecting the first signal lines end at an utmost first connection point in regard to the charging cable the temperature can be very accurately determined. The charging connector can be a combination of an AC connector with a DC option and is called in such case Combo Coupler, while variant with IEC Type 2 is often abbreviated as Combo2. The charging connector is also referred to as electrical connector or coupler and/or can be provided as an Electrical Vehicle Supply Equipment, EVSE. Arranged within the charging connector means that the electrical connection is integrated within the charging connector.

In another preferred implementation of the DC charging cable or of the method, the charging connector comprises contact pins which are connected to the DC conductors and which constitute the first connection point. Preferably each DC conductor is connected to a respective PIN with the charging connector. Preferably the first connection point is arranged within the charging connector.

In a further preferred implementation, the DC charging cable or the method comprises a charging device to which a first end or a second, opposite end of the DC charging cable is connected, whereby the second connection point is arranged within the charging device. The charging device is preferably configured for connecting to an AC grid via and/or comprises a transformer and/or a rectifier for receiving respectively converting electrical energy to be provided to the electrical vehicle for charging a battery of the electrical vehicle. Preferably, the voltage measurement device is arranged within the charging device. The charging device may comprise a plurality of DC charging cables, each provided as described before, for charging difference different electrical vehicles.

In another preferred implementation of the DC charging cable or of the method, in regard to the DC charging cable, the control device is configured for calibrating the measured voltage difference in regard to the temperature or, in regard to the method, comprising the step of: Calibrating the measured voltage difference in regard to the temperature. The actual temperature of the DC charging cable, the DC conductors respectively of the copper of the DC conductors might be proportional to or comprise a second order approximation of the measured voltage. Thus, calibrating the control device respectively such method step improves the accuracy of the control device respectively of the method.

In a further preferred implementation of the DC charging cable or of the method, in regard to the DC charging cable, the control device is configured for measuring a current of at least one of the DC conductors or, in regard to the method, comprising the step of: Measuring a current of at least one of the DC conductors. With the measured current flowing in the DC conductors when charging the electrical vehicle together with the measure voltage, an actual resistance of the DC conductors can be determined.

In another preferred implementation of the DC charging cable or of the method, in regard to the DC charging cable, the control device is configured for determining the temperature based on a predetermined resistances at a known temperature and/or on a calibrated resistance of the DC conductors or, in regard to the method, comprising the step of: Determining the temperature based on a predetermined resistances at a known temperature and/or on a calibrated resistance of the DC conductors. As the resistance of the DC conductors varies with the temperature of the DC conductors, combined with a predetermined resistances at a known temperature and/or a calibrated resistance of the DC conductors, an actual temperature of the DC conductors respectively of the copper of the DC conductors can be calculated.

In a further preferred implementation of the DC charging cable or of the method, in regard to the DC charging cable, the control device is configured for controlling a charging current of the DC conductors in response to the measured temperature or, in regard to the method, comprising the step of: Controlling a charging current of the DC conductors in response to the measured temperature. During normal charging operations, for example in Europe, the DC charging cable may have an initial temperature of 18° Celsius, which may increase, during charging, up to 40° Celsius. In deserts, the temperature of the DC charging cable may increase up to 70° Celsius. Thus, in order to avoid an overheating and/or malfunction of the DC charging cable and/or the charging device, the control device respectively the method may reduce the charging current provided by the charging device if the temperature exceeds a predefined threshold. The predefined threshold may be, for example, 50, 60 or 70° Celsius, whereby the reduction may be −20, −50 or −100% i.e. switching off charging. The control device, which can be provided as computerized mean, respectively the method can be configured to resume charging once the temperature has decrease under the threshold. In a further implementation, the control device respectively the method can be configured to control the charging current such that the predefined temperature threshold is not exceeded during charging.

In another preferred implementation of the DC charging cable or of the method, the DC conductors comprise a diameter of ≥25 mm², 50 mm² or 70 mm², the second signal line comprises a diameter of ≤0.5 mm², 0.7 mm² or 1 mm² and/or the charging cable, the signal line comprises a length of ≥4 m, 5 m or 7.5 m and ≤5 m, 7.5 m or 10 m, and/or the DC conductors are cooled. For cooling the DC conductors, a cooling device can be provided, which is preferably arranged at the charging device, and/or which is configured that a cooling fluid is conveyed from the first end to the second end of the DC charging cable respectively of the DC conductors, and thereafter from the second end to the first end. The DC charging cable may comprise additional DC conductors i.e. more than two DC conductors, which could be equipped with a respective signal line. Thus, the term comprising two DC conductors is to be understood that additional DC conductors could be present as well. Preferably, the DC conductors and the signal line are encased with a cable coating and/or cable sheaths for forming the DC charging cable. Further preferably, the DC conductors and/or the signal line are insulated and/or comprise an insulating coating.

Further embodiments and advantages of the method are directly and unambiguously derived by the person skilled in the art from the DC charging cable as described before.

BRIEF DESCRIPTION OF DRAWINGS

These and other aspects of the invention will be apparent from and elucidated with reference to the embodiments described hereinafter.

In the drawings:
FIG. 1 shows a direct current, DC, charging cable according to an exemplary implementation in a schematic view.

DESCRIPTION OF EMBODIMENTS

FIG. 1 shows a direct current, DC, charging cable according to an exemplary implementation in a schematic view. The DC charging cable comprises two DC conductors 1, 2 for transmitting electrical energy between an electrical vehicle 3 and a charging device 4, with one DC conductor 1 having a positive potential and the other DC conductor 2 having a negative potential. The DC charging cable may comprise further conductors, such as a Proximity Pilot, PP, line for transmitting a PP signal, a Control Pilot, CP, line for transmitting a CP signal and/or a PE line for transmitting a PE signal, which are not depicted in FIG. 1. The DC conductors 1, 2 comprise a diameter of, typically, between 25 to 50 mm² for transmitting typical charging currents of typically 500 A.

A charging connector 5 is connected to a first end 6 of the DC charging cable, whereas a second, opposite end 7 of the DC charging cable is connected to the charging device 4. Such way the DC charging cable extends between its first end 6 and its second end 7 along a distance of 5 m. The charging connector 5 comprises contact pins 8, which are connected to the first ends 6 of the DC conductors 1, 2 for electrically connecting the electrical vehicle 3.

In addition to the two DC conductors 1, 2, the DC charging cable comprises two signal lines 9, 10, depicted as dotted lines, which run in parallel in an insulated manner to the DC conductors 1, 2 along the distance of 5 m. Specifically, referring to FIG. 1, the upper signal line 9 runs parallel to the upper DC conductor 1 and is connected at its first signal line end 11 at a first connection point 12 to the upper DC conductor 1 at the upper contact pin 8. In an analogous manner, the lower signal line 10 runs parallel to the lower DC conductor 2 and is connected at its respective first signal line end 11 at a respective first connection point 12 to the lower DC conductor 2 at the respective lower contact pin 8.

A second, opposite signal line end 13 of the upper signal line 9 is connected via a voltage measurement device 15 at a second connection point 14 arranged within the charging device 4 to the upper DC conductor 1. In an analogous manner, a respective second, opposite signal line end 13 of the lower signal line 9 is connected via a respective voltage measurement device 15 at a respective second connection point 14 arranged within the charging device 4 to the lower DC conductor 2. Such way the second connection point 14 is arranged distant to the first connection point 12.

A computerized control device 16 is arranged within the charging device 4 and is configured for measuring a respective voltage difference between both second signal line ends 13 and both the second connection points 14. The control device 16 further measures a charging current of the DC conductors 1, 2. Based on a calibrated resistance of the DC conductors 1, 2 at a known temperature, the control device 16 determines from the measured voltage difference and the measure charging current an actual temperature of the DC conductors 1, 2 respectively of copper of the conductors 1, 2. Thereby, the control device 16 may combine or calculate an average of the measured voltage differences, charging currents and/or temperatures measured at respectively calculated for the upper DC conductor 9 and the lower conductor 10. It could be further required that the control device calibrates the measure voltage difference in regard to the temperature, for example by comparing with reference data for the voltage difference and temperature.

In response to the determined temperature, the control device 16 may control the charging current of the DC conductors 1, 2. If the temperature of the DC conductors 1, 2 exceed a predefined threshold, the charging current can be reduced by a certain degree or even turned off. For example, charging may be stopped if the temperature exceeds 70° Celsius and can be resumed if the temperature has fallen to 50° Celsius. Alternatively, the control device 16 may control the charging current of the DC conductors 1, 2 such that the temperature of the DC conductors 1, 2 does not exceed a predefined threshold.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 (Upper) DC conductor
2 (Lower) DC conductor
3 Electrical vehicle
4 Charging device
5 Charging connector
6 First end
7 Second, opposite end
8 Contact pin
9 (Upper) Signal line
10 (Lower) Signal line
11 First signal line end
12 First connection point
13 Second, opposite signal line end
14 Second connection point
15 Measurement device
16 Control device

The invention claimed is:

1. A direct current (DC), charging cable, comprising:
two DC conductors configured for transmitting electrical current from a charging device to an electrical vehicle, at least a signal line having a first signal line end and a second, opposite signal line end, and a control device, wherein:
the first signal line end is connected at a first connection point to one of the DC conductors, and
the control device connects the second signal line end to the one of the DC conductors and is configured for measuring a voltage difference between the second signal line end and a second connection point of the one of the DC conductors distant to the first connection point due to an internal resistance of the one of the DC conductors for determining a temperature of the DC charging cable.

2. The DC charging cable according to claim 1, further comprising a voltage measurement device arranged between the second signal line end and the second connection point, and/or
wherein the signal line runs between the first connection point and the second connection point parallel to the one of the DC conductors.

3. The DC charging cable according to claim 1, further comprising a second signal line having a respective first signal line end and a respective second, opposite signal line end,
wherein the respective first signal line end is connected to the other one of the DC conductors at a respective first connection point, and
the control device is configured for measuring a second voltage difference between the respective second signal line end and a respective second connection point of the other one of the DC conductors distant to the respective first connection point for determining a second temperature of the DC charging cable.

4. The DC charging cable according to claim 3, wherein the control device is configured for combining the measured voltage difference and the measured second voltage difference and/or the determined temperature and the determined second temperature.

5. The DC charging cable according to claim 1, wherein the DC charging cable comprises a first end and a second, opposite end, the first connection point is at the first end and the second connection point is at the second end.

6. The DC charging cable according to claim 1, comprising a charging connector to which a first end or a second, opposite end of the DC charging cable is connected, wherein the first connection point is arranged within the charging connector.

7. The DC charging cable according to claim 1, further comprising a charging device to which a first end or a second, opposite end of the DC charging cable is connected, whereby wherein the second connection point is arranged within the charging device.

8. The DC charging cable according to claim 1, wherein the control device is configured for calibrating the measured voltage difference in regard to the temperature and/or the control device is configured for measuring a current of at least one of the DC conductors.

9. The DC charging cable according to claim 1, wherein the control device is configured for determining the temperature based on a predetermined calibrated resistance at a known temperature of the DC conductors and/or the control device is configured for controlling a charging current of the DC conductors in response to the measured temperature.

10. A method for determining a temperature of a DC charging cable, comprising two DC conductors configured for transmitting electrical current from a charging device and an electrical vehicle, at least a signal line having a first signal line end and a second, opposite signal line end, wherein the first signal line end is connected at a first connection point to one of the DC conductors, and comprising:
measuring, by a control device, a voltage difference between the second signal line end and the one of the DC conductors at a second connection point distant to the first connection point due to an internal resistance of the one of the DC conductors for determining the temperature of the DC charging cable.

11. The method according to claim 10, wherein the signal line runs between the first connection point and the second connection point parallel to the one of the DC conductors.

12. The method according to claim 11, further comprising a second signal line having a respective first signal line end and a respective second, opposite signal line end,
   wherein the respective first signal line end is connected to the other one of the DC conductors at a respective first connection point, and
   which further comprises measuring a second voltage difference between the respective second signal line end and a respective second connection point of the other one of the DC conductors distant to the respective first connection point for determining a second temperature of the DC charging cable.

13. The method according to claim 12, which further comprises combining the measured voltage difference and the measured second voltage difference and/or the determined temperature and the determined second temperature.

14. The method according to claim 12, wherein the DC charging cable comprises a first end and a second, opposite end, the first connection point is at the first end and the second connection point is at the second end.

15. The method according to claim 12, further comprising a charging connector to which a first end or a second, opposite end of the DC charging cable is connected, wherein the first connection point is arranged within the charging connector.

16. The method according to claim 12, further comprising a charging device to which a first end or a second, opposite end of the DC charging cable is connected, wherein the second connection point is arranged within the charging device.

17. The method according to claim 12, further comprising calibrating the measured voltage difference in regard to the temperature.

18. The method according to claim 10, further comprising measuring a current of at least one of the DC conductors.

19. The method according to claim 10, further comprising determining the temperature based on a predetermined resistance at a known temperature of the DC conductors.

20. The method according to claim 12, further comprising controlling a charging current of the DC conductors in response to the measured temperature.

* * * * *